(12) United States Patent
Detrois et al.

(10) Patent No.: US 8,663,412 B2
(45) Date of Patent: Mar. 4, 2014

(54) CLOSURE

(75) Inventors: Christian Detrois, Golbey (FR);
Jean-Paul Cerveny, Vittel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/503,505

(22) PCT Filed: Oct. 21, 2010

(86) PCT No.: PCT/EP2010/065840
§ 371 (c)(1),
(2), (4) Date: Apr. 23, 2012

(87) PCT Pub. No.: WO2011/048167
PCT Pub. Date: Apr. 28, 2011

(65) Prior Publication Data
US 2012/0214655 A1 Aug. 23, 2012

(30) Foreign Application Priority Data
Oct. 23, 2009 (EP) ..................................... 09173867

(51) Int. Cl.
*B65B 7/00* (2006.01)
(52) U.S. Cl.
USPC ...... 156/69; 156/73.1; 156/308.2; 156/308.4; 53/487; 53/488
(58) Field of Classification Search
USPC ........... 53/476, 477, 478, 485, 486, 484, 487, 53/488, 489; 156/69, 73.1, 292, 293, 294, 156/308.2, 308.4, 580.1, 580.2; 264/503; 215/251, 253, 278
See application file for complete search history.

(56) References Cited

U.S. PATENT DOCUMENTS

| 3,441,161 A | * | 4/1969 | Van Baarn | 215/235 |
| 3,795,558 A | * | 3/1974 | Dabney et al. | 156/73.1 |
| 4,033,472 A | * | 7/1977 | Aichinger | 215/256 |

(Continued)

FOREIGN PATENT DOCUMENTS

| EP | 1225029 | 7/2002 |
| JP | 1023934 | 1/1989 |

OTHER PUBLICATIONS http://www.polymersdatabase.com/entry.do?id=1211&exno=1211&method=view&si=P 2002.*

(Continued)

*Primary Examiner* — Yogendra Gupta
*Assistant Examiner* — Hannuri L Kwon
(74) *Attorney, Agent, or Firm* — K&L Gates LLP

(57) ABSTRACT

The present invention is directed to process for making a packaging, said packaging comprising a container (2) with a container body (5) and a container opening having an upper edge, said packaging further comprising a closure (4) for closing said container, the container and the closure being made out of polyethylene terephtalate (PET), polyethylene naphtalate (PEN), or a combination thereof, said container (2) and said closure (4) comprising respectively first (8) and second (9) attachment means, characterized in that: said process comprising the steps of in order: (i) fitting said first (8) and second (9) attachment means to each other, (ii) deforming at least one of the first and/or second attachment means up to the point of permanent deformation of the PET or PEN material, by punching, rolling, or a combination thereof, so as to create a permanent, leak-tight, attachment between said container and said closure.

1 Claim, 4 Drawing Sheets

(56) References Cited

U.S. PATENT DOCUMENTS

| | | | |
|---|---|---|---|
| 4,392,055 A | | 7/1983 | Whitney |
| 4,458,821 A | * | 7/1984 | Ostrowsky .................. 215/252 |
| 4,746,025 A | * | 5/1988 | Krautkramer et al. ........ 215/232 |
| 5,115,938 A | * | 5/1992 | Thompson .................. 220/618 |
| 5,125,886 A | | 6/1992 | Dirksing |
| 5,256,225 A | | 10/1993 | Dwinell |
| 5,673,808 A | | 10/1997 | Valti et al. |
| 6,520,370 B2 | * | 2/2003 | Nyman et al. ............... 220/832 |
| 6,977,104 B1 | | 12/2005 | Nahill et al. |
| 7,497,346 B2 | * | 3/2009 | Albers ........................ 215/354 |
| 2003/0084648 A1 | * | 5/2003 | Seidita ........................ 53/471 |

OTHER PUBLICATIONS http://www.polymersdatabase.com/entry.do?id=2855&exno=2855&method=view&si=P 2002.*

PCT International Search Report for Application No. PCT/EP2010/065840 mailed on Feb. 8, 2011.

Written Opinion of the PCT International Searching Authority for Application No. PCT/EP2010/065840 mailed on Feb. 8, 2011.

* cited by examiner

CLOSURE

CROSS REFERENCE TO RELATED APPLICATIONS

The present application is a National Stage of International Application No. PCT/EP2010/065840, filed on Oct. 21, 2010, which claims priority to European Patent Application No. 09173867.4, filed on Oct. 23, 2009, the entire contents of which are being incorporated herein by reference.

FIELD OF THE INVENTION

The present invention concerns a manufacturing process for making a packaging comprising at least two parts which are assembled by deforming one portion of the plastic material—preferably polyethylene terephtalate (PET) or polyethylene naphtalate (PEN) of at least one of these parts.

BACKGROUND OF THE INVENTION

A packaging generally comprises a container with a container opening that is closed by a closure element.

The assembly process of the closure element (cap) to the container requires to have cooperating screw threads on these two parts of the packaging, or an equivalent means such as clipping cooperating elements.

There is a need for an alternative system for efficiently and reliably attaching a closure element to a container.

SUMMARY OF THE INVENTION

The technical problem mentioned above is met with a process for making a packaging, said packaging comprising a container with a container body and a container opening having an upper edge, said packaging further comprising a closure for closing said container, the container and the closure being preferably made out of polyethylene terephtalate (PET), polyethylene naphtalate (PEN), or a combination thereof, said container and said closure comprising respectively first and second attachment means, characterized in that: said process comprising the steps of, in order:

(i) fitting said first and second attachment means to each other, (ii) deforming at least one of the first and/or second attachment means up to the point of permanent deformation of the PET, PEN, PETG, PTT, PLA, PHAs or other materials with according stiffness properties, by punching, rolling, or a combination thereof, so as to create a permanent attachment between said container and said closure.

In one possible embodiment of the present invention, the process further comprises ultrasonic welding of the first and second attachment means, in addition to the permanent deformation of said first and/or second attachment means.

In a highly preferred embodiment of the invention, the first attachment means is a groove having at least one of its walls which is deformable by punching or rolling, and the second attachment means is an extending ridge adapted in shape and size to be inserted into the groove, and in that the closure is attached to the container in an arrangement by inserting the closure ridge into the container groove and permanently deforming at least one wall of the groove so as to unremovably catch the ridge into the groove.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
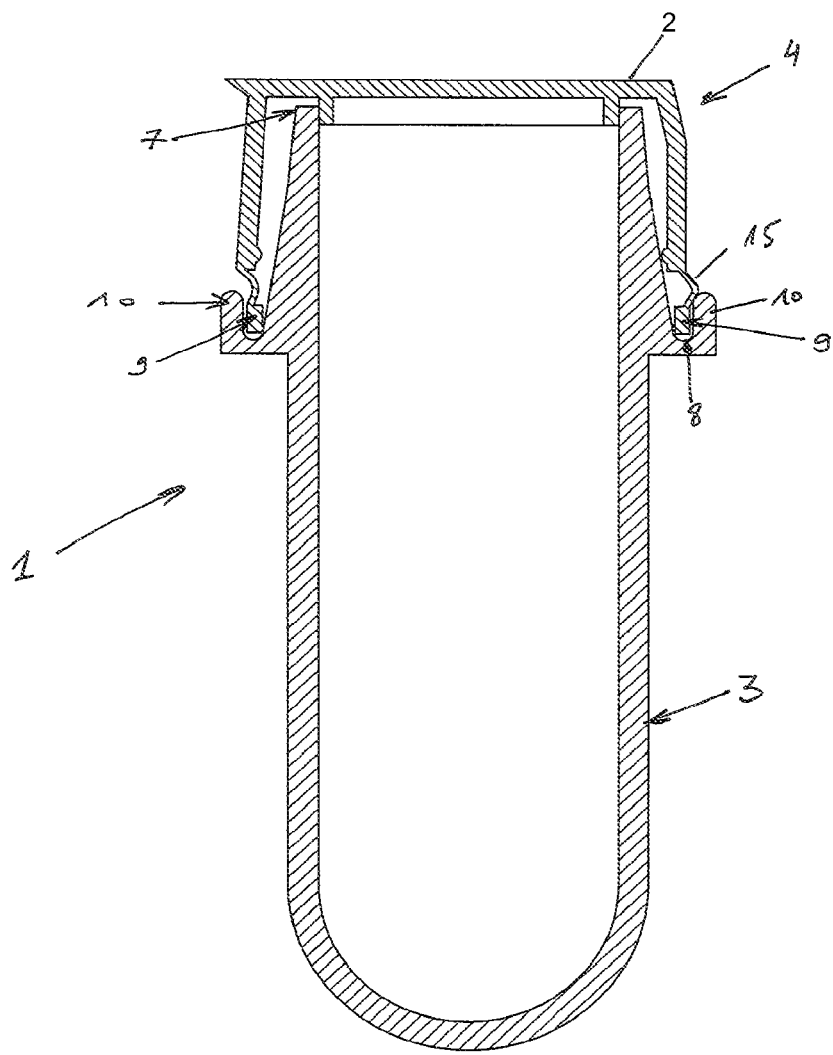
FIG. 1 is a schematic cut profile view showing a packaging assembled according to the present invention, with attachment means not yet deformed.

As illustrated in FIG. 1, the invention concerns a process for making a packaging 1 comprising a bottle 2 made from blow-moulding of a preform 3, the bottle 2 being closed by a closure 4, and the bottle 2 being made of polyethyleneterephtalate (PET), PETG (glycol-modified polyethylene terephthalate), PEN (Polyethylene Naphthalate), PTT (Poly Trimethylene Terephthalate), PLA (Polylactic acid), PHAs (Polyhydroxyalkanoate) or materials with according stiffness properties, and the closure being made of PE (polyethylene) or PP (polypropylen).

In the present description, it can be seen from the drawing that FIG. 1 represents a not yet blown bottle, so what is represented in FIG. 1 is the PET preform 3 that will later be blown into a full size bottle.

The container 2 comprises a container body 5 and a container opening having an upper edge. Said container 2 and said closure 4 comprising first 8 and second 9 corresponding attachment means.

According to the invention, the second attachment means 9 are adapted in shape and size to cooperate with the first attachment means 8, and both attachment means 8, 9 are made of PET and integrally part of the rest of the pieces they are linked to—they could however be added to existing parts, by any means of linking, such as heat sealing, ultrasonic welding for instance—. More than that, both attachment means 8, 9 are adapted in shape and size to deform permanently by rolling to create a permanent arrangement between said container 2 and said closure 4.

Figure 2:
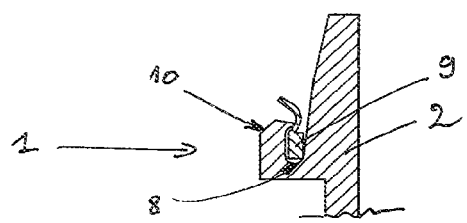
FIG. 2 is an enlarged schematic profile cut view showing the attachment means with one wall of the attachment groove that is deformed to permanently catch the ring-shaped base of a closure.

As can be seen from FIG. 1 and FIG. 2, the first attachment means is a groove 8 having one of its walls 10 which is deformable by rolling, as illustrated in FIG. 2. The second attachment means is an extending ridge 9 that is adapted in shape and size to be inserted into the groove 8, such that the closure can be attached to the container in a arrangement by inserting the closure ridge into the container groove and permanently deforming the wall 10 of the groove 8 so as to unremovably catch the ridge 9 into said groove 8.

Of course, the example described herein shall not be taken as a limiting example, and for instance the first attachment means of the closure could be a groove, whereas the second attachment means of the container could be a corresponding ridge (inverted positioning of the attachment means relative to the constitutive parts of the packaging.

The deformable groove wall 10 is about 1.5 mm thin so as to be more easily deformable during the rolling operation, and so as to avoid possible problems of cracking or whitening of the plastic material when the deformation is applied. The flexibility and permanent deformation of the material is made possible when the piece to be deformed is sufficiently thin so as to bend, up its point of permanent deformation, without stressing too much the plastic material.

As illustrated in FIG. 1, the closure element comprises a ring-shaped base and an overcap attached to the base. The closure's ridge extends from the lower edge of the ring-shaped base. The overcap is pivotably attached to the spout or, respectively, to the ring-shaped base, by a pivot hinge. The ring-shaped base is about 3 mm in height.

As shown in FIG. 2, the ridge 9 of the closure is disposed into the groove 8 of the preform (or bottle) neck, and the latter is permanently deformed after the rolling operation, in a position that locks the ridge 9 into the groove 8, so that the closure 4 is permanently attached to the neck of the bottle 2.

The groove is a U-shaped groove with a height of at least 2, preferably at least 3 mm, and a width sufficient to accommodate the ridge of the closure.

Figure 3:
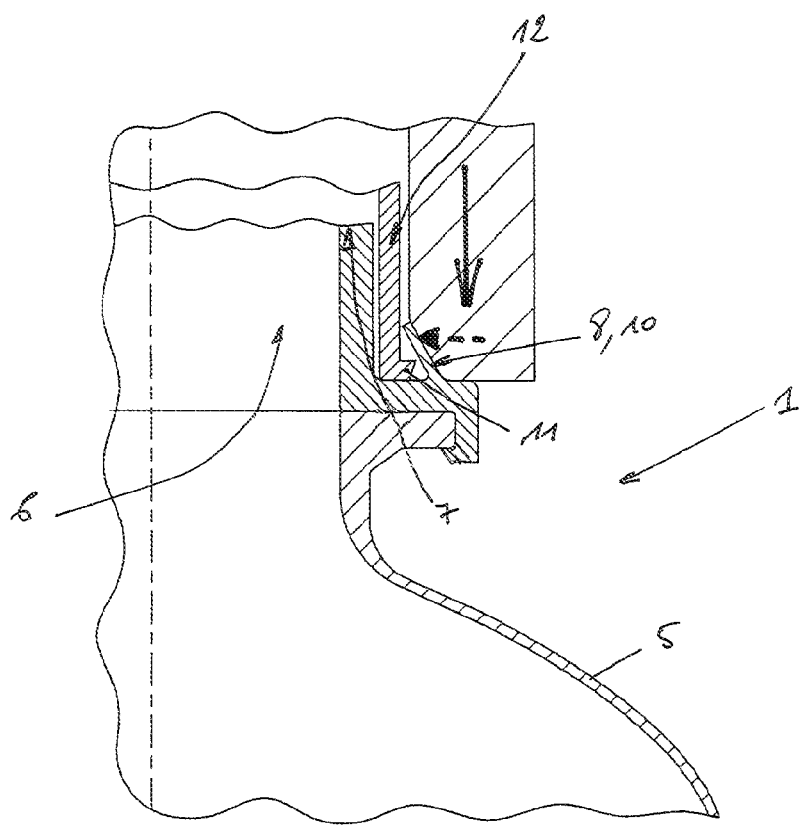
FIG. 3 is an partial profile schematic cut view showing how different parts of the packaging are assembled by rolling in conjunction with ultrasonic sealing.

The permanent deformation can be performed by punching, rolling, cold forming, hot forming, or a combination thereof. As illustrated in FIG. 3, the permanent deformation technique cited before can also be used in combination with ultrasonic welding, so that when the second attachment means is deformed to catch the first attachment means, in order to create a fluid-tight connection between said container and said closure (or spout), an additional ultrasonic welding step is performed to create a permanent seal between the container 2 and the closure 4 (or spout 4),. At the sealed interface between these two parts of the packaging, the plastic material is melted, and then colds back to its initial solid state, in such a way that the closure (or spout), and the container form one single integral piece. Such a ultrasonic welding operation is performed in this case with a sonotrode, which also plays the role of a puncher that deforms the attachment means of the container, before (or at the same time) transmitting ultrasonic waves to seal the closure (or spout), and the container together.

A spout is A lip used to funnel content, placed on top of a container (e.g. as sports closure). Spouts in the bottled beverages industry are used to allow convenient drinking from the bottle directly without using a glass or cup.

The permanent deformation of the PET or PEN is performed at a temperature comprised between 0° C. and the glass transition temperature of the plastic material. This temperature of glass transition is well defined for both thermoplastics used in the present invention. For PET, the temperature of glass transition is Tg=69° C. For PEN, this temperature of glass transition is Tg=122° C. However, preferably the permanent deformation is applied at a temperature which is comprised in a more restricted range, and a range which is closer to ambient temperature, that is to say a temperature comprised between 18° C. and 40° C., more preferably at a temperature comprised between 20° C. and 30° C.

In the example shown in FIG. 3, the attachment means of the bottle 2 is a circular ridge 9, that is deformed inwardly towards the centre of the bottle, and catches the attachment means of the closure, which is a horizontal extension 11 of the closure skirt 12.

Actually, the attachment means of the container and/or the closure could be not entirely circular (i.e. all around the periphery), but rather on a portion of the circumference of the container and/or closure, or even at very specific points of the said container and/or closure.

Figure 4:
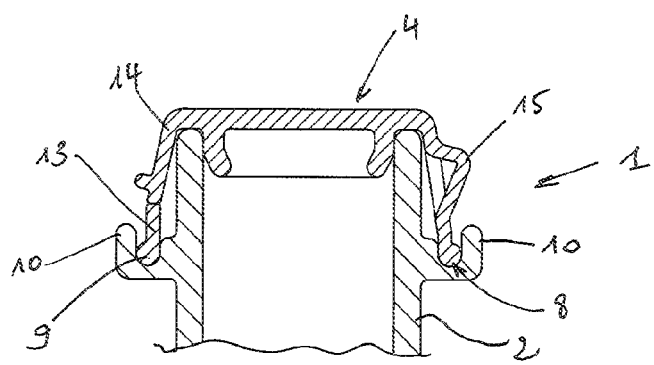
FIG. 4 is a schematic profile cut view showing the top portion of a packaging according to the invention, before the attachment means of the container are deformed to attach the closure element to said container.
Figure 5:
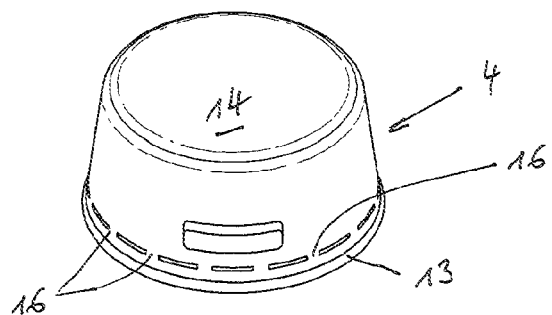
FIG. 5 is a perspective top view showing a closure element.
Figure 6:
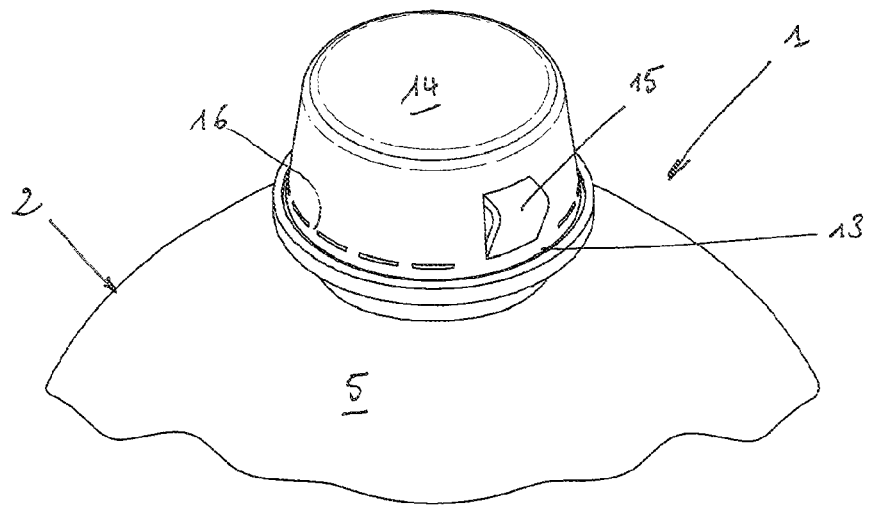
FIG. 6 is a perspective top view similar to FIG. 4.

As illustrated in FIGS. 4, 5 and 6, the closure 4 can be a hinged closure, comprising a base ring 13 and an overcap 14 that is pivotably attached to the ring 13 by a hinge 15.

As shown in FIG. 4, the lower part of the ring 13 is disposed into a groove 8 of the bottle neck, before a wall 10 of said groove is deformed to permanently catch the ring 13, as described before. In that case and as shown in FIG. 5 and FIG. 6, the overcap 14 is moulded as one integral piece with the ring 13, but these two parts are linked via breakable bridges 16, which are broken by tearing when the used first lifts the overcap 14 to open the closure 4. This systems constitutes a tamper-evident means.

Figure 7:
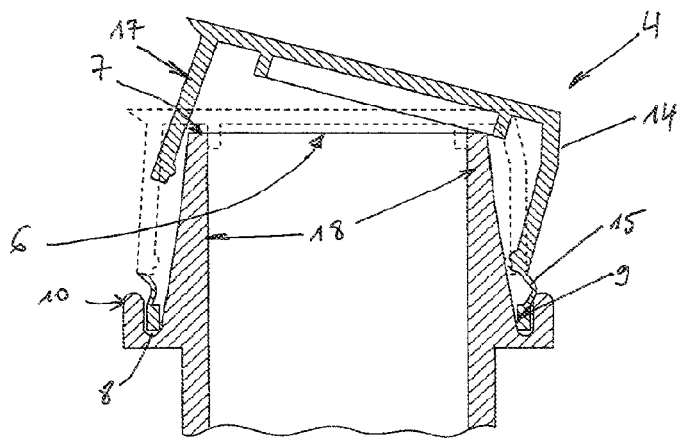
FIG. 7 is a view similar to FIG. 4, where a hinged overcap is partially open; this figure illustrates the difficulty to pivot completely the overcap in open position when the walls of the spout and the over cap are tall.

However, as shown in FIG. 7, there can be a problem for lifting the overcap 14 due to the functional dimensions of said overcap: in that case, it can be become impossible to lift the overcap as its front wall 17 will be stopped by the container neck 18.

Figure 8:
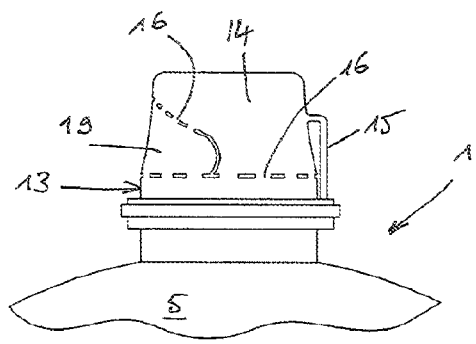
FIG. 8 is profile view showing the top portion of a packaging according to the invention, where the overcap comprises a tamper-evident detachable front tab.
Figure 9:
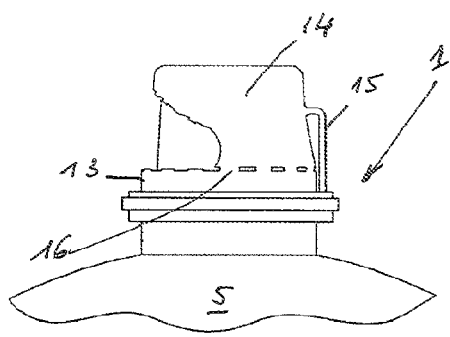
FIG. 9 is a view similar to FIG. 8, wherein the detachable front tab was removed in order to allow complete lifting of the overcap.

In order to avoid the potential problem illustrated in FIG. 7, the closure front wall 17 is preferably equipped with a detachable front wall portion 19 as illustrated in FIG. 8, that can be torn off before lifting the overcap 14 in open position of the closure, as shown in FIG. 9.

This detachable portion 19 is moulded as an integral portion of the rest of the closure 4, but linked to the latter by breakable bridges 16 of plastic material. This detachable front wall portion 19 of the closure can be also integral to the ring 13 of the closure (embodiment not shown in the drawing), or alternatively it can be also detachable from the ring 13, as illustrated in FIG. 9.

Figure 10:
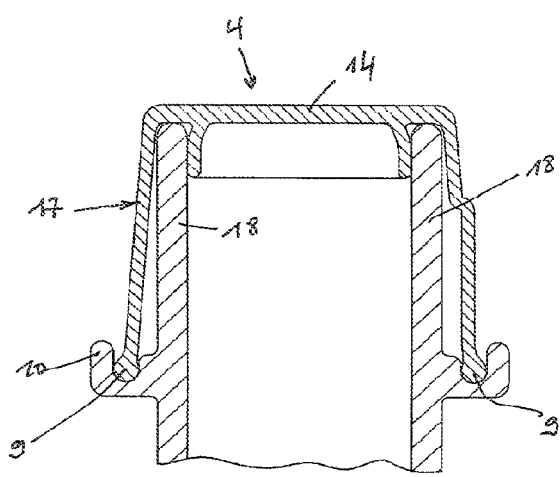
FIG. 10 is a view similar to FIG. 4 showing high closure walls.

As shown in FIG. 10, a detachable front wall portion 19 of the closure 4, makes it possible for a very tall neck 18 of the closure which will still be closed with a hinged closure.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The process according to the invention is more specifically disclosed in the claims.

Claim 1 is dealing with a process for making a packaging (1), said packaging (1) comprising a container (2) with a container body (5) and a container opening (6) having an upper edge (7), said packaging (1) further comprising a closure (4) for closing said container, the container (2) being made out of polyethylene terephtalate (PET), polyethylene naphtalate (PEN) and the closure being made out of PE(polyethylen) or PP (polypropylen) or a combination thereof, said container and said closure comprising respectively first (8) and second (9) attachment means, characterized in that: said process comprising the steps of, in order:

(i) fitting said first (8) and second (9) attachment means to each other, (ii) deforming at least one of the first (8) and/or second (9) attachment means up to the point of permanent deformation of the PET or PEN material, by punching, rolling, or a combination thereof, so as to create a permanent attachment between said container (2) and said closure (4).

Claim 2 is dealing with a process according to claim 1, which further comprises ultrasonic welding of the first (8) and second (9) attachment means, in addition to the permanent deformation of said first and/or second attachment means.

Claim 3 is dealing with a process according to any of the preceding claim 1 or 2, wherein the first attachment means (8) is a groove having at least one of its walls (10) which is deformable by punching or rolling, and the second attachment means (9) is an extending ridge adapted in shape and size to be inserted into the groove (8), and in that the closure (4) is attached to the container (2) in a water-tight arrangement by inserting the closure ridge (9) into the container groove (8) and permanently deforming at least one wall of the groove (8) so as to unremovably catch the ridge (9) into the groove (8).

Claim 4 is dealing with a process according to any of the preceding claims 1 to 3, wherein said permanent deformation of the PET or PEN is performed at a temperature comprised between 0° C. and the glass transition temperature of the plastic material, preferably a temperature comprised between 18° C. and 40° C., more preferably at a temperature comprised between 20° C. and 30° C.

The invention claimed is:

1. A process for making a packaging, the process comprising the steps of:
   coupling a first member of a container to a second member of a closure, the container comprising a plastic material selected from the group consisting of polyethylene terephtalate (PET) and polyethylene naphtalate (PEN), the closure comprising a ring and an overcap pivotally attached to the ring by a hinge, and the coupling step comprising inserting the ring into a groove in the first member; and
   forming the packaging by deforming at least one of the first or second members up to the point of permanent deformation of the plastic material, the deformation performed by a step selected from the group consisting of punching, rolling and a combination thereof so as to create a permanent attachment between the container and the closure, and the permanent deformation comprising deforming a wall of the groove to enclose the ring in the groove.

* * * * *